United States Patent Office 3,629,404
Patented Dec. 21, 1971

3,629,404
ENZYME INHIBITORS 19,042 R.P., 21,052 R.P. AND 21,053 R.P.
Jean Edmond Marie Florent, Paris, Denise Mancy, Charenton, Val-de-Marne, and Jean Verrier, Boulogne-sur-Seine, Hauts-de-Seine, France, assignors to Rhone-Poulenc S.A.
Filed May 2, 1969, Ser. No. 821,277
Claims priority, application France, May 3, 1968, 150,509
Int. Cl. A61k 21/00
U.S. Cl. 424—117                9 Claims

ABSTRACT OF THE DISCLOSURE

The new enzyme inhibitor 19,042 R.P., and its principal constituents 21,052 R.P. and 21,053 R.P., are produced by aerobically cultivating the microorganism *Streptomyces hygroscopicus* DS 10,408 (NRRL 3286) in an aqueous nutrient medium. The said products also possess antifibrinolytic and anticoagulant activity.

---

This invention relates to a new enzyme inhibitor, hereinafter designated by the number 19,042 R.P., its principal constituents, hereinafter designated by the numbers 21,052 R.P. and 21,053 R.P., and their salts, a process for the preparation of 19,042 R.P., a process for the isolation of 21,052 R.P. and 21,053 R.P. from 19,042 R.P., and pharmaceutical compositions which contain at least one of these products as active ingredient.

19,042 R.P., 21,052 R.P. and 21,053 R.P. are of very particular interest as agents which inhibit trypsin; furthermore, they possess valuable antifibrinolytic and anticoagulant properties.

The enzyme inhibitor 19,042 R.P. is produced by culture in artificial culture media of a microorganism belonging to the genus Streptomyces, designated by the name of "*Streptomyces hygroscopicus* DS 10,408" and can be separated into its constituents by physico-chemical methods. A specimen of this strain of Streptomyces has been deposited with the United States Department of Agriculture, Northern Regional Research Laboratory, at Peoria, Ill., United States of America, and has been given the number NRRL 3286; a sample of the microorganism can be obtained from the aforementioned Research Laboratory.

The enzyme inhibitor 19,042 R.P. as obtained according to the process of the present invention described in detail hereinafter is a mixture of several constituents, of which some are in the form of salts with inorganic acids such as hydrochlorides and sulphates.

The enzyme inhibitor 19,042 R.P., and its two principal constituents 21,052 R.P. and 21,053 R.P. respectively in the form of a sulphate and a hydrochloride, are very soluble in water and in dilute acids, soluble in mixtures of water and alcohols (e.g. aqueous methanol and ethanol) and of water and acetone, and very sparingly soluble in concentrated aqueous solutions of neutral salts (e.g. sodium chloride or ammonium sulphate), anhydrous alcohols, acetone, hexane, ethyl acetate, diethyl ether and chlorinated hydrocarbons (e.g. chloroform).

19,042 R.P., 21,052 R.P. and 21,053 R.P. give positive tests with the following reagents: biuret reagent, Folin reagent, Reindel reagent (hypochlorite and o-tolidine), Ehrlich reagent (p-dimethylaminobenzaldehyde) with which they give a yellow colour, Sakaguchi reagent (hypobromite and α-naphthol), Milko and Jones reagent (nitroprusside and ferricyanide), Loring reagent (picric acid in an alkaline medium) with which they give an orange colour, Wolfrom and Miller reagent (periodic acid, permanganate and benzidine), Grönwall and Koiw reagent (periodic acid and fuchsin), and ninhydrin reagent after hydrolysis. They give negative tests with the following reagents: Gerngross reagent (α-nitroso-β-naphthol and nitric acid), Pauly reagent (diazotised sulphanilic acid), Toennies and Kolb reagent (iodoplatinate or nitroprusside), Sanger and Tuppy reagent (p-anisidine), Bial reagent (orcinol), Partridge reagent (naphthoresorcinol) and Morgan and Elson reagent (acetylacetone and p-dimethylaminobenzaldehyde).

Acid hydrolysis of the enzyme inhibitor 19,042 R.P. has made it possible to detect the following aminoacids: arginine, phenylalanine, proline and valine, and seven guanidines.

21,052 R.P. in the form of a sulphate contains carbon, hydrogen, oxygen, nitrogen and sulphur. Its elementary composition is approximately: C=48.3%, H=6.0%, O=18.2%, N=21.2%, S=4.5%. This product in the form of a sulphate can be converted to the hydrochloride by the action of barium chloride.

21,053 R.P. in the form of a hydrochloride contains carbon, hydrogen, oxygen, nitrogen and chlorine. Its elementary composition is approximately: C=49.5%, H=7.1%, O=17.5%, N=21.8%, Cl=4.9%. This product in the form of a hydrochloride can be converted to a sulphate by the action of silver sulphate.

Hydrolysis of 21,052 R.P. and 21,053 R.P. has made it possible to detect the aminoacids arginine, phenylalanine, proline and valine in the ratio of 1–1–1–5, and seven guanidines. Furthermore 21,052 R.P. yields a product which in the modified Siphonelli reaction gives a colour which is characteristic of α-diols.

21,052 R.P. in the form of a sulphate and 21,053 R.P. in the form of a hydrochloride are characterised by the physical properties given below:

Appearance: whitish amorphous powders
Ultra-violet spectra (determined using 0.05% solutions in water)

| Wavelengths | $E_{1\,cm}^{1\%}$ | |
|---|---|---|
| | 21,052 R.P. | 21,053 R.P. |
| 200 nm. | 435 | 530 |
| 243 nm. (absorption minimum) | 4.5 | 2.9 |
| 257 nm. (absorption maximum) | 5.25 | 3.4 |

"Nm." being the abbreviation for nanometres.
Infra-red spectra (determined with tablets of a mixture with KBr.).

Figure 2:
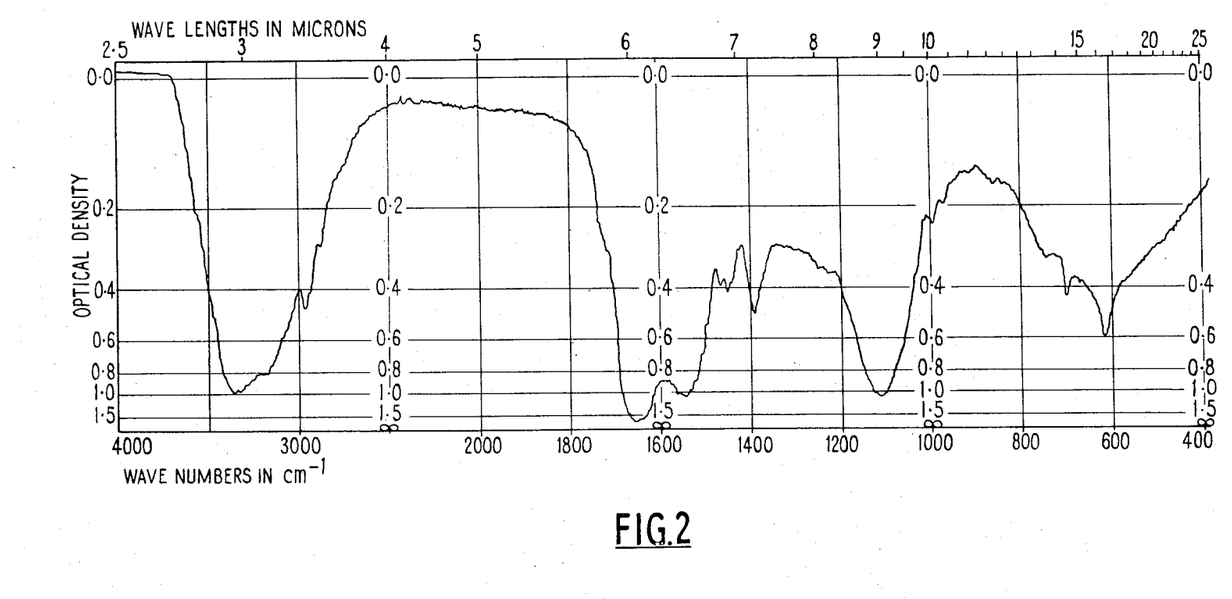
Figure 3:
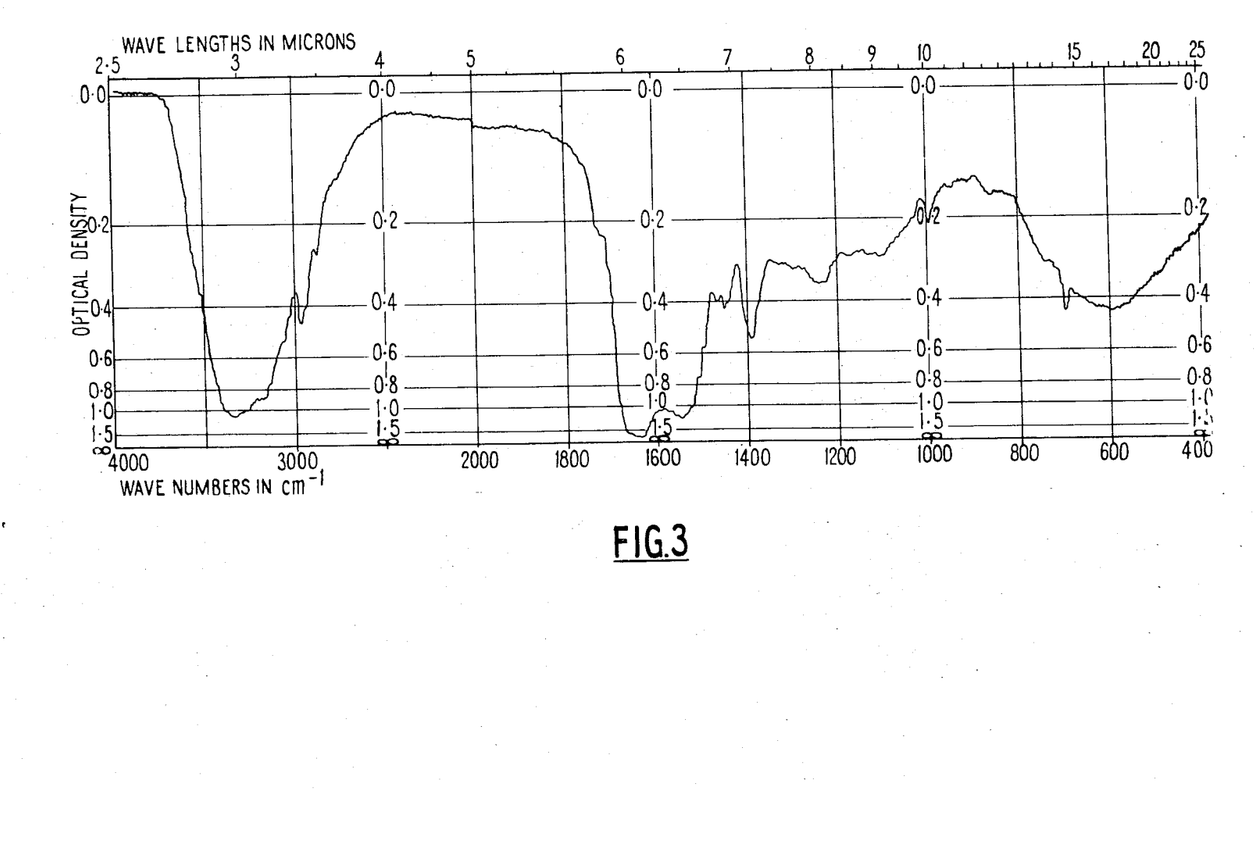

These spectra are shown in FIGS. 2 (21,052 R.P.) and 3 (21,053 R.P.) of the accompanying drawings in which the abscissae give the wave lengths expressed in microns (upper scale) and the wave numbers cm.$^{-1}$ (lower scale), and the ordinates give the optical densities.

Table I below gives the principal infra-red absorption bands for these two products.

TABLE I

| 21,052 R.P. | | | 21,053 R.P. | | |
|---|---|---|---|---|---|
| 3,350 s | 1,525 sh | 1,115 s | 3,340 s | 1,525 sh | 1,175 w |
| 3,200 s | 1,505 sh | 1,030 sh | 3,260 sh | 1,505 sh | 1,125 w |
| 2,960 m | 1,495 sh | 995 w | 3,190 m | 1,495 sh | 1,100 m |
| 2,940 sh | 1,470 w | 970 w | 2,960 m | 1,465 w | 1,030 sh |
| 2,875 w | 1,450 m | 945 sh | 2,940 sh | 1,450 m | 995 m |
| 2,740 sh | 1,445 vw | 910 vw | 2,880 sh | 1,430 sh | 945 w |
| 1,730 sh | 1,435 sh | 860 m | 2,750 sh | 1,390 m | 910 w |
| 1,715 sh | 1,390 m | 740 m | 1,755 sh | 1,330 w | 860 w |
| 1,655 vs | 1,380 vw | 715 sh | 1,720 sh | 1,295 w | 740 sh |
| 1,640 m | 1,250 w | 695 m | 1,645 vs | 1,230 m | 720 sh |
| 1,545 s | 1,220 sh | 615 s | 1,545 s | 1,225 m | 695 m |
| | | | | | 630 sh |
| | | | | | 590 s | where vs=very strong, s=strong, m=medium, w=weak, vw=very weak, and sh=shoulder.

Optical rotations (determined using a 0.9% solution in water).

| Wavelengths | $[\alpha]^{20}$ | |
| --- | --- | --- |
| | 21,052 R.P. | 21,053 R.P. |
| 589 nm. (D line of sodium) | $-22° \pm 1°$ | $-23.5° \pm 1°$ |
| 436 nm | $-45.5° \pm 1.5°$ | $-46.5° \pm 1.5°$ |
| 365 nm | $-71° \pm 2°$ | $-71.5° \pm 2°$ |

In ascending chromatography on paper (Arches paper 302) the enzyme inhibitor 19,042 R.P. and its two principal constituents 21,052 R.P. and 21,053 R.P. behave identically. The RF values obtained with different development solvents are indicated in Table II (development at 20° C., detection by colorimetric methods or by measurement of the anti-trypsin activity or anticoagulant activity).

TABLE II

| Development solvent: | Rf |
| --- | --- |
| Butanol-acetic acid-water (4-2-4 by volume) | 0.80 |
| Butanol-pyridine-acetic acid-water (30-20-6-24 by volume) | 0.66 |

The enzyme inhibitor 19,042 R.P. and its constituents behave identically on electrophoresis and can be identified by electrophoretic migration on a cellulose acetate membrane using different buffers:

Citric acid-disodium phosphate ---- pH=2.2, $\mu$=0.09
Acetic acid-sodium acetate -------- pH=4, $\mu$=0.1
5,5-diethyl-barbituric acid -------- pH=8.6, $\mu$=0.075
Sodium hydroxide-glycine -------- pH=9.6, $\mu$=0.1

The methods of detection are the same as those used for the chromatography.

Regardless of the buffer used, the greater part of this product migrates towards the cathode. For example, at pH 8.6 there is a displacement of 30 to 32 mm./30 minutes at a constant voltage of 250 volts (with the current varying from 4 to 6 miliamperes).

The anti-enzymatic activity of 19,042 R.P. and of its constituents can be characterised by their IC$_{50}$, being the concentration which under the conditions of the given enzymatic reaction inhibits the activity of the enzyme present by 50%. The inhibitory concentration values for various enzymes are given in Table III which follows.

The anti-enzymatic activity is determined using the following techniques:

Ref. A—I. Trautschold and E. Werle, "Methods of Enzymatic Analysis," H. U. Bergmeyer Ed., Acad. Press., p. 880 (1963).

Ref. B—W. Rick, "Methods of Enzymatic Analysis," H. U. Bergmeyer Ed., Acad. Press., p. 815 (1963).

Ref. C—idem, p. 811.
Ref. D—idem, p. 800.
Ref. E—idem, p. 819.
Ref. F—F. Markwardt, K.O. Haustein and H. P. Klöcking, Arch. Intern. Pharmacodynam., 152, 233 (1964).
Ref. G—L. R. Christensen, J. Clin. Invest. 28, 163 (1949).
Ref. H—D. L. Kline, "Methods in Enzymology," S. P. Colowick and N. O. Kaplan Ed., Acad. Press., volume II, 156 (1955).

TABLE III

| References | Reaction | Reaction conditions | | 50% inhibitor concentration in mg./l. | | |
| --- | --- | --- | --- | --- | --- | --- |
| | | pH | Temperature,° | 19,042 R.P. | 21,052 R.P. | 21,053 R.P. |
| A | Esterolysis of BAEE by kallicrein (a) | 8.0 | 25 | 26.5 | 35 | 29 |
| B | Esterolysis of BAEE by trypsin (b) | 7.7 | 25 | 0.4 | 0.4 | 0.43 |
| C | Proteolysis of casein by trypsin (c) | 7.6 | 37 | 0.16 | 0.15 | 0.15 |
| D | Proteolysis of casein by chymotrypsin (d) | 7.6 | 37 | 2.05 | 135 | 185 |
| E | Proteolysis of haemoglobin by pepsin (e) | 1.8 | 25 | >400 | >400 | >400 |
| F | Fibrinolysis by streptokinase of a clot formed from rabbit plasma (f) | 7.5 | 37 | 4.5 | 10 | 9 |
| G | Fibrinolysis by urokinase of a clot formed from purified cattle fibrinogen (g) | 7.4 | 37 | 21 | 35 | 21 |
| H | Coagulation of cattle fibrinogen by thrombin (h) | 7.4 | 37 | 32 | 34 | 35 |

Concentrations of enzyme and of substrate:
(a) Kallicrein: 700 u./l.; B.A.E.E.=5.10$^{-4}$ M (ethyl ester of benzoyl-arginine).
(b) Crystalline trypsin=2.5 mg./l.; B.A.E.E.=5.10$^{-4}$ M.
(c) Crystalline trypsin=1.5 mg./l.; Casein=5 g./l.
(d) Crystalline chymotrypsin=2.5 mg./l.; Casein=5 g./l.
(e) Crystalline pepsin=1.66 g./l.; Haemoglobin=16.6 g./l.
(f) Streptokinase=10$^5$ u./l.; Rabbit plasma 400 ml./l.
(g) Urokinase 14,000 u./l., Purified cattle plasminogen 175 mg./l; Purified cattle fibrinogen 3.6 g./l.
(h) Thrombin 5,000 u./l.; Purified cattle fibrinogen 10 g./l.

The anti-enzymatic, antifibrinolytic and anti-coagulant activities have been confirmed on laboratory animals. Thus, the activity on the capillary permeability towards intravenous injection of trypsin in rats is shown by an ED$_{50}$ of about 20 mg./kg. The antifibrinolytic activity in rabbits is equivalent to that of ε-aminocaproic acid administered intravenously [F. Markwardt et al., Arch. intern. Pharmacodynam., 152, 223 (1964)]. The anticoagulant activity determined on dogs by intravenous administration shows the effect on the Howell time and on the pro-thrombin time to be about 10 times weaker than that of heparin.

At a dose of 50 mg./kg. administered intravenously 19,042 R.P. partially protects dogs against fibrinopenia following on an intravascular coagulation caused by the intravenous injection of thrombokinase [technique of Nordström, Ollson and Blombäck, Nature 206, 632 (1965)].

The toxicity of 19,042 R.P. has been studied principally in mice. The 50% lethal dose, or LD$_{50}$, determined intraperitoneally is between 300 and 1000 mg./kg. Administered orally, 19,042 R.P. is atoxic at a dose of 1000 mg./kg.

In human therapy, 19,042 R.P. and its constituents are particularly interesting as antifibrinolytic agents. In adults daily doses of between 5 and 50 mg./kg. administered intravenously or subcutaneously can be used. Administered orally, daily doses of between 50 and 500 mg./kg. can be used.

The organism which produces the enzyme inhibitor 19,042 R.P. belongs to the genus Streptomyces and is designated by the name of "Streptomyces hygroscopicus DS 10,408" (NRRL 3286). The organism was isolated from a sample of soil taken from Normandy in France.

The method of isolation was as follows: The sample of soil was suspended in sterile distilled water and the suspension diluted to different concentrations; a small volume of each dilution was spread over the surface of Petri dishes containing a nutrient agar medium. After incubation for several days at 25° C., the colonies of microorganisms to be isolated were pricked out and transplanted onto agar slopes in order to obtain abundant cultures.

This organism belongs to the genus Streptomyces and, more precisely, to the species S. hygroscopicus, of which the essential characteristics have been defined by H. D. Tresner and E. J. Backus (Applied Microbiology, 4, 243–250, 1956) and by S. A. Waksman (The Actinomycetes, II, The Williams and Wilkins Company, Baltimore, 1961, pp. 230–231). The following are the reasons why the organism which produces 19,042 R.P. is considered to belong to this species and named *Streptomyces hygroscopicus* DS 10,408.

*S. hygroscopicus* DS 10,408 in effect shows three characteristics of the species *S. hygroscopicus* defined by H. D. Tresner and E. J. Backus and by S. A. Waksman:

(a) Its sporiferous filaments generally end in tight spirals having a coil with a varying number of turns, most frequently 1 to 5, though occasionally longer spirals containing a larger number of turns are observed; these spiral sporiferous filaments are inserted on the filaments on which they are carried sometimes alone but more frequently in clusters;

(b) The sporulated aerial structure, when it has reached a good stage of development, shows a deep grey tint corresponding to that shown by the species *S. hygroscopicus*;

(c) On certain culture media which permit good sporulation, the appearance on ageing of black, glossy, moist sporulated areas characteristic of this species *S. hygroscopicus* in the sporulated zones. In *S. hygroscopicus* DS 10,408 the conversion of the deep grey sporiferous mat into a black coating is in particular observed on Hickey and Tresner agar, Carvajal oat agar, Pridham starch agar and Grundy starch agar.

The morphological features shown by cultures of *S. hygroscopicus* DS 10,408 are on the whole very similar to those of the description of *S. hygroscopicus* given in The Actinomycetes (S. A. Waksman); the only appreciable differences which can be observed consist in that *S. hygroscopicus* DS 10,408, contrary to the strain described in The Actinomycetes, yields a light yellow soluble pigment on gelatine, does not cause milk to turn acid, and reduces nitrates to nitrites on Czapek sucrose broth. However, these few differences are not sufficiently important, according to the concepts of H. D. Tresner and E. J. Backus, to consider this organism as constituting a different species from the species *S. hygroscopicus*, of which it otherwise shows the principal characteristics used to define it.

*S. hygroscopicus* DS 10,408 forms sporiferous filaments which, in the majority of instances, end in tight spirals generally comprising 1 to 5 turns, although occasionally spirals with a larger number of turns are present or, again occasionally, it forms sporiferous filaments which are simply curved at their end portion without forming a complete turn, or again sometimes spirals which are more or less loose and unrolled. The sporiferous apparatus most frequently shows a complex structure: sporiferous filaments, which can themselves be more or less branched, are inserted along the principal sporiferous filament, which can reach quite long lengths, the whole forming a cluster. The spores are oval and measure about 0.4 to 0.6 $\mu$./0.6 to 0.9 $\mu$. Microscopic examinations show an organisation identical to the sporiferous structure on Bennett agar and on Pridham starch agar.

The culture characteristics and biochemical properties peculiar to *S. hygroscopicus* DS 10,408 were examined on nutrient agars and on nutrient broths usually employed to examine the appearance of strains of streptomyces, the cultures on agar media being effected on agar slopes. The observations are recorded in Table V which follows. Unless otherwise stated, they relate to cultures of about three weeks at 26° C. which have reached a good stage of development. A large number of the culture media employed were prepared in accordance with the formulae given in "The Actinomycetes," S. A. Waksman, pp. 193–197, Chronica Botanica Company, Waltham, Massachusetts, U.S.A., 1950; in that case they are indicated by the letter W followed by the number given to them in "The Actinomycetes." The references or compositions of the other culture media are as follows:

Ref. A—K. L. Jones—Journal of Bacteriology, 57, 142, 1949

Ref. B—"Hickey and Tresner's Agar"—T. G. Pridham et al.—Antibiotics Annual, 1956–1957, pp. 947–953

Ref. C—"Yeast Extract Agar"—T. G. Pridham et al.—Antibiotics Annual, 1956–1957, pp. 947–953

Ref. D—Grundy et al.—Antibiotics and Chem. 2, 400, 1952

Ref. E—Grundy et al.—Antibiotics and Chem. 2, 401, 1952

Ref. F—Peptone 0.5%—Meat extract 0.3%—Tyrosine 0.5%—Agar 2%

Ref. G—"Inorganic Salts—Starch Agar"—T. G. Pridham et al.—Antibiotics Annual, 1956–1957, pp. 947–953

Ref. H—Grundy et al.—Antibiotics and Chem. 1, 310, 1951

Ref. I—Corresponds to Formula W1, with 30 g. of sucrose replaced by 15 g. of glucose Ref. J—"Plain Gelatine"—prepared in accordance with the directions of "Manual of Methods for Pure Culture Study of Bacteria"—Society of American Bacteriologists, Geneva, N.Y.—II$_{50}$–18

Ref. K—Manual of Methods for Pure Culture Study of Bacteria—Society of American Bacteriologists, Geneva, N.Y.—II$_{50}$–18

Ref. L—Corresponds to Formula W18 with the sucrose omitted and replaced by small strips of filter paper partially immersed in the liquid Ref. M—Medium suggested for the investigation of the production of $H_2S$ by: H. D. Tresner and F. Danga—Journal of Bacteriology, 76, 239–244 (1958)

Ref. N—"Melanin formation medium"—The Actinomycetes, vol. 2, p. 133—No. 42—S. A. Waksman—The Williams and Wilkins Company, Baltimore, 1961

Ref. O—Skimmed milk as a commercially available powder, reconstituted in accordance with the manufacturer's instructions

TABLE IV

| Culture medium | Degree of development | Vegetative mycelium or underside of the culture | Aerial structure (comprising the combination of the aerial mycelium and the sporulation) | Soluble pigment | Observations and biochemical properties |
| --- | --- | --- | --- | --- | --- |
| Bennett agar (Ref. A) | Very good | Underside light brownish yellow. | Grey. Well developed. | Yellow to light brown-yellow. | |
| Emerson agar (W 23) | Good | Underside light brown-yellow. | Whitish. Fairly well developed. | Light yellow-brown. | |
| Hickey and Tresner agar (Ref. B). | Very good | Underside brown-yellow | Well developed. Light greyish to grey, with black spots characteristic of "*Hygroscopicus*." | Greyish yellow-brown. | |
| Pridham yeast extract agar (Ref. C). | Good | Underside yellow to yellow-brown. | Whitish to grey Well developed. | Yellow to yellow-brown. | |
| Carvajal oat agar (Ref. D). | do | do | Fairly well developed. Greyish white to grey, with black spots characteristic of "*Hygroscopicus*." | Greyish brown-yellow. | |
| Glucose-peptone agar (W 6). | Fairly good | Underside brown-yellow to light orange-brown. | Whitish to yellowish white. Moderately developed. | Light yellow-brown to light orange-brown. | |

TABLE IV—Continued

| Culture medium | Degree of development | Vegetative mycelium or underside of the culture | Aerial structure (comprising the combination of the aerial mycelium and the sporulation) | Soluble pigment | Observations and biochemical properties |
|---|---|---|---|---|---|
| Nutrient agar (W 5) | Moderate | Fairly well developed. Yellowish grey to light brownish yellow. Underside yellowish. | Traces. Greyish white | Nil | |
| Glucose-asparagine agar (W 2). | do | Underside light yellow | Greyish white. Moderately developed. | Nil or slightly yellowish. | |
| Glycerine-asparagine agar (W 3). | Fairly good | Underside light brownish yellow. | Greyish white. Very moderately developed. | Light greyish yellow. | |
| Krainsky calcium malate agar (Ref. E). | Poor | Colourless to whitish. Poorly developed. | Whitish to greyish. Traces. | Nil | Positive but slow solubilisation of the malate. |
| Tyrosine agar (Ref. F) | Moderate | Underside yellow to yellow-brown. | Whitish to greyish. Moderately developed. | Brownish yellow to yellow-brown. | Solubilisation of the tyrosine: positive but slow. |
| Starch agar (W 10) | Poor | Underside light yellowish white. | Whitish. Traces | Nil | Hydrolysis of starch: positive but slow. |
| Pridham starch agar (Ref. G). | Fairly good | Underside light yellow | Greyish white to grey, with small black spots characteristic of "Hygroscopicus." | Greyish yellow, low intensity. | Hydrolysis of starch: positive. |
| Grundy starch agar (Ref. H). | do | Underside greyish yellow | Greyish white to grey and waxy black. Typical appearance of "Hygroscopicus." | do | |
| Czapek synthetic agar with sucrose (W 1). | do | Vegetative mycelium very well developed wrinkled, with a tendency to split. Yellow. Underside light yellow. | Whitish to light greyish. Poorly developed. | Weak brownish yellow. | |
| Czapek synthetic agar with glucose (Ref. I). | do | Underside yellow | Whitish. Moderately developed. | Weak yellow | |
| Culture on potato (W 27) | Good | Thick and wrinkled vegetative mycelium yellow. | Whitish to light greyish. Moderately developed. Exudation of small golden yellow droplets. | weak greyish yellow. | |
| 12% pure gelatine (Ref. J) | Fairly good | Surface culture well developed. Underside yellow. | Whitish to light greyish. Moderately developed. | Light yellow | Fairly good liquefaction of the gelatine. |
| Nutrient nitrate broth (Ref. K). | Moderate | Yellowish white ring | Nol | Nil | Nitrite reaction: negative during tests carried out respectively after 24 hours, 48 hours, 8 days, 15 days and 1 month of culture. |
| Starch-nitrate broth (W 19). | Moderate and slow. | Small colonies with light yellowish underside, on the surface. | Whitish. Traces | Nil to very light yellowish. | Nitrite reaction: positive after 1 week's culture. |
| Czapek sucrose broth (W 18). | do | Small colonies with light yellowish underside, on the surface. | do | Nil | Nitrite reaction: positive after 1 week's culture, rapidly becoming negative after 2 weeks' culture. |
| Czapek cellulose broth (Ref. L). | No development. | | | | Utilisation of cellulose: negative. |
| Tresner and Danga agar (Ref. M). | Medium | Underside light brownish yellow. | Whitish to greyish white. Poorly developed. | Nil or very weak brownish yellow after 1 week's culture. | Production of $H_2S$: negative (readings taken in accordance with the recommendations of the authors). |
| Tyrosine-yeast extract agar ["Melanin formation medium" of Waksman] (Ref. N). | do | Underside yellow | Whitish. very moderately developed. | Light yellow after 1 week's culture. | Formations of melanin: negative (readings taken in accordance with the recommendations of the author). |
| Skimmed milk (Ref. O) | do | Fairly well developed ring. Underside light brownish yellow. | Whitish. Traces | | No coagulation. Peptonisation slow, complete in 1 month. pH changing from 6.4 to 7.0 in 1 month. |

Following the principle of the method of Pridham (Journal of Bacteriology, 56, 107–114, 1948), it has been found that *Streptomyces hygroscopicus* DS 10,408 utilises the following compounds moderately or well as sources of carbon; glucose, galactose, levulose, mannose, lactose, maltose, sucrose, trehalose, raffinose, dextrin, starch, glycogen, glycerine, adonitol mannitol, sorbitol and inositol. The following compounds are only used poorly and very slowly; xylose, succinic acid and malic acid. The following compounds are not used at all: arabinose, rhamnose, sorbose, cellobiose, inulin, erythritol and dulcitol.

The assessment of the sources of nitrogen which *S. hygroscopicus* DS 10,408 can utilise to ensure its development was made following the principle of the same method of Pridham, using glucose as the source of carbon in all cases and replacing the $(NH_4)_2SO_4$ of the base medium by various nitrogen-containing compounds. Under these conditions *S. hygroscopicus* DS 10,408 uses the following compounds moderately or well: $(NH_4)_2SO_4$, $(NH_4)_2HPO_4$, $NaNO_2$, $NaNO_3$, adenine, adenosine, urea, DL-asparagine, glycine, DL-alanine, DL-valine, DL-aspartic acid, L(+) glutamic acid, L(+) arginine, L(+) lysine, DL-threonine, DL-proline, L(−) hydroxyproline and L(−) histidine. The following compounds are also used but more slowly: DL-phenylalanine, L(−) tyrosine and L-tryptophan. The following compounds are not used: uracil, sarcosine, taurine and betaine.

According to a feature of the invention, 19,042 R.P. is produced by aerobically cultivating *Streptomyces hygroscopicus* DS 10,408 (NRRL 3286), or a 19,042 R.P.-producing mutant thereof, using an aqueous nutrient medium containing assimilable sources of carbon, nitrogen and inorganic substances, and separating 19,042 R.P. formed during the culture.

The culture of *Streptomyces hygroscopicus* DS 10,408 can be carried out by any of the known aerobic surface or submerged culture methods, the latter being preferred because they are more convenient. Conventional types of apparatus currently used in the fermentation industry may be employed. In particular, the following sequence of operations may be adopted:

*Streptomyces hygroscopicus* DS 10,408—stock
↓
culture on agar
↓
culture in an agitated flask
↓
inoculum culture in a fermenter
↓
production culture in a fermenter The fermentation medium must contain an assimilable source of carbon and an assimilable source of nitrogen, and inorganic substances and optionally growth-promoting factors; all these ingredients may be supplied as well-defined products or complex mixtures such as those found in natural biological products of various origins.

As the source of assimilable carbon there may be used carbohydrates such as glucose, sucrose, lactose, dextrins, starch, molasses or other carbon-, hydrogen- and oxygen-containing substances such as certain sugar-alcohols, e.g. glycerine or mannitol, or certain organic acids, e.g., lactic, citric or tartaric acid. Certain animal or vegetable oils such as lard oil or soya bean oil may be advantageously used instead of, or in admixture with, carbon-, hydrogen- and oxygen-containing substances. Glucose, sucrose and glycerine are particularly favourable sources of carbon.

The suitable sources of assimilable nitrogen are extremely varied. They may be very simple chemical compounds such as nitrates, inorganic and organic ammonium salts, urea or amino acids. They may also be complex substances containing principally nitrogen in protein form, e.g. casein, lactalbumin, gluten and their hydrolysates, soya bean meal, peanut meal, fish meal, meat extract, yeast extract, distillers' solubles or corn-steep liquor. Hydrolysates of casein are particularly favourable as sources of nitrogen.

Amongst the inorganic substances added, some may have a buffering or neutralising effect, such as the alkali metal or alkaline earth metal phosphates, or the carbonates of calcium or magnesium. Others contribute to the ionic equilibrium needed for the development of *Streptomyces hygroscopicus* DS 10,408 and for the production of the enzyme inhibitor; examples of these are the chlorides and sulphates of the alkali metals and alkaline earth metals. Finally, some of them act more especially as activators of the metabolism of *Streptomyces hygroscopicus* DS 10,408: such are the salts of iron and cobalt. Iron salts and cobalt salts are particularly favourable sources of inorganic substances.

Amongst thickeners of the culture medium, those most generally used are starch, carboxymethylcellulose and agar.

A particularly favourable equilibrium of these various elements consists of a medium very rich in nitrogen-containing substances and poor in sugars or equivalent substances.

The pH of the fermentation medium at the start of the culture should be between 6.0 and 7.8, and preferably between 6.5 and 7.5. The optimum fermentation temperature is 25–28° C., but satisfactory production is achieved at temperatures of from 23° to 40° C. The rate of aeration of the fermentation broth can vary within quite wide limits, but it has been found that an aeration rate of 0.3 to 2 litres of air per litre of broth per minute is particularly suitable. The maximum yield of 19,042 R.P. is obtained after 20 to 40 hours culture, but this period depends predominantly on the medium used. After 40 hours, and more particularly when the pH of the medium is above 8, a considerable degradation of the product occurs.

19,042 R.P. may be isolated from the fermentation broths by various methods. The fermentation broth may be filtered at a pH of between 2 and 8 and preferably between 2 and 4, the filtrate concentrated to a fifth to a tenth of its volume under reduced pressure at a temperature of between 5° and 30° C., neutral salts such as NaCl or $(NH_4)_2SO_4$ added to the concentrate up to a concentration of 25 to 75% (weight/volume) and 19,042 R.P. extracted by repeated extractions with a solvent which is immiscible with water such as a liquid aliphatic alcohol containing at least 4 carbon atoms, a chlorinated hydrocarbon (for example chloroform) or diethyl ether. It is particularly advantageous to use n-butanol. 19,042 R.P. can be isolated from organic solutions by concentrating the solution under reduced pressure at a temperature of from 5° to 25° C., followed by precipitation by a poor solvent such as petroleum ether, cyclohexane or acetone at a temperature between −15° and +10° C.

The 19,042 R.P. present in the filtrate can also be fixed to a carboxylic ion exchange resin equilibrated to a pH of between 3 and 7, preferably about 5, and then be eluted with a 0.1 N to 5 N solution of hydrochloric acid in methanol or ethanol; 0.5 N solution in 70% methanol is advantageously employed. The active eluates are neutralised, concentrated under reduced pressure to distil off the alcohol, and 19,042 R.P. thereafter extracted under the conditions described above.

The crude 19,042 R.P. thus obtained can then be purified by one of the following methods:

(a) Preparation of the picrate followed by its purification, and regeneration of the purified 19,042 R.P. from this salt, for example by means of hydrochloric acid in an aqueous-alcoholic solution;

(b) Chromatography on a dextran or polyacrylamide gel in aqueous acid solution, preferably using dilute hydrochloric acid;

(c) Chromatography on alumina which has beforehand been treated with an aqueous or aqueous-alcoholic solution of sulphuric acid or hydrochloric acid.

When the alumina is treated with sulphuric acid, the product is in the form of a mixture of sulphates and hydrochlorides. When the alumina is treated with hydrochloric acid, the product is in the form of a mixture of hydrochlorides.

According to another feature of the invention, 19,042 R.P. is separated into its principal constituents 21,052 R.P. and 21,053 R.P. by chromatography on a dextran or polyacrylamide gel or on alumina in aqueous or aqueous-alcoholic solution.

The following examples illustrate the invention. The activity of the products is determined in anti-trypsin units. By definition, one anti-trypsin unit (u.) is the amount of inhibitor required to reduce by 50% the caseinolytic activity of 1.5 μg. of crystalline trypsin at pH 7.6 and at 37° C. The conditions for the determination are identical to those of Kunitz, J. Gen. Physiol. 30 291 (1947).

EXAMPLE 1

A 170-litre fermenter is charged with—

| | G. |
|---|---|
| Peptone | 600 |
| Meat extract | 600 |
| Hydrated glucose | 1200 |
| Sodium chloride | 600 |
| Agar-agar powder | 240 |
| Water, sufficient to make up to 110 l. | |

The pH of the mixture is adjusted to 7.0 with concentrated sodium hydroxide solution (d=1.33; 100 cc.). The medium is sterilised by bubbling steam at 122° C. through it for 40 minutes. After cooling, the volume of the broth is 120 litres and the pH is 6.6. The medium is then inoculated with a culture (200 cc.) of *Streptomyces hygroscopicus* DS 10,408 (NRRL 3286) in a shaken Erlenmeyer flask. The culture is developed at 27° C. for 24 hours with agitation and aeration with sterile air; it is then suitable for inoculation of the production culture.

The production culture is carried out in an 800-litre fermenter charged with the following substances:

| | Kg. |
|---|---|
| Peptone | 16 |
| Calcium carbonate | 1 |
| Agar-agar powder | 0.8 |
| Water, sufficient to make up to 355 l. | |

After adjustment of the pH of the mixture to 7.0 with concentrated sodium hydroxide solution (d.=1.33; 770 cc.), the medium is sterilised by bubbling steam at 122° C. through it for 40 minutes. After cooling, a sterile aqueous solution (15 litres) containing hydrated glucose (6 kg.) is added to the broth. The volume of the broth is then 400 litres and its pH is 6.8. It is inoculated with the inoculum culture (40 litres) produced in the 170 litre-fermenter. The production culture is carried out at 27° C. for 33 hours with agitation, using a motor rotating at 205 revolutions per minute and aeration with a volume of sterile air of 15 m.$^3$/hour. The pH of the medium is then 8.0 and the volume of the broth is 400 litres. A determination of the anti-trypsin activity of this broth shows that its strength is 735 u./cc.

EXAMPLE 2

The broth (400 litres), prepared under the conditions described in Example 1 and of strength 620 u./cc., is introduced into a vat provided with a stirrer. The pH of the broth is adjusted to 3 with 5 N hydrochloric acid (1500 cc.). A filtration aid (20 kg.) is then added. The mixture is filtered on a filter press and the filter cake is washed with water (75 litres). A filtrate (400 litres) of strength 640 u./cc. is thus obtained. The filtrate is concentrated to a fifth of its volume under reduced pressure at 30° C.; a concentrate (80 litres) of strength 2855 u./cc. is obtained.

Crystalline ammonium sulphate (40 kg.) is added to this concentrate and the pH is adjusted to 3 by addition of 5 N hydrochloric acid (550 cc.). The mixture is cooled to 5° C. and extracted with butanol (3 × 40 litres). The butanol extracts are mixed and then concentrated under reduced pressure at 30° C. A butanol extract (10 litres) is thus obtained.

An insoluble material consisting mainly of ammonium sulphate is removed by filtration and acetone (60 litres) is then added to the clarified concentrate at 25° C. The precipitate is washed, filtered and then dried in a vacuum oven (20 mm. Hg) at 30° C. to yield a product (568 g.) of strength 255 u./mg.

EXAMPLE 3

The crude product (200 g.), prepared under the conditions described in Example 2 and of strength 115 u./mg., is suspended in distilled water (2 litres). The suspension is stirred for one hour at ambient temperature and then filtered through paper.

A saturated solution (1 volume) of picric acid in 0.1 N sodium hydroxide solution is slowly added with stirring to the filtered solution. The insoluble picrate formed is filtered off using a sintered glass filter and then copiously washed with distilled water; it is then dissolved in an aqueous-alcoholic solution (300 cc.) of hydrochloric acid (3 N hydrochloric acid—absolute ethanol: 3–7 by volume).

Actone (15 litres) is slowly added to this solution with constant stirring. The precipitate thus formed is filtered off using a sintered glass filter, washed with acetone and then dissolved in distilled water (500 cc.). After lyophilisation of the solution, 19,042 R.P. (4.45 g.) of strength 1335 u./mg. is obtained.

EXAMPLE 4

The product (6.5 g.) prepared under the conditions described in Example 3 and of strength 1415 u./mg. is suspended in 0.01 N hydrochloric acid (100 cc.). An inactive insoluble material is removed by filtration.

The filtered solution is chromatographed through a column of the polyacrylamide gel "Biogel P4." The column is 7.5 cm. in diameter and contains "Biogel P4" (0.5 kg.) in 0.01 N hydrochloric acid (giving a height of 60 cm.). The solution of the enzyme inhibitor is passed through the column at a flow rate of 2.5 cc./minute and this is followed by elution with 0.01 N hydrochloric acid at the same flow rate. The eluate is collected in fractions of about 50 cc. Determination of the anti-trypsin activity of the fractions which absorb ultra-violet light at 280 nm. makes it possible to combine those fractions which are rich in 19,042 R.P. Fractions 1 to 20 contain practically nothing. Fractions 21 to 44 and 54 to 80 contain inactive products which absorb in the ultra-violet. Fractions 45 to 53, having an activity of between 8,000 and 40,000 u./cc., are combined.

The solution is lyophilised and 19,042 R.P. (1.95 g.) of strength 3,480 u./mg. is obtained.

EXAMPLE 5

The product (8 g.), prepared under the conditions of Example 4 and of strength 3430 u./mg., is dissolved in distilled water (60 cc.).

The solution is chromatographed through an alumina column. The column is 6 cm. in diameter and contains alumina (1 kg.) which has beforehand been treated with sulphuric acid (pH 4) in distilled water (giving a height of 38 cm.). The solution is passed through the column at a flow rate of 2 cc./minute and this is followed by elution with distilled water at the same flow rate. The eluate is collected in fractions of about 50 cc. Determination of the anti-trypsin activity of the fractions which absorb ultra-violet light at 280 nm. makes it possible to combine those fractions which are rich in 19,042 R.P. Fractions 0 to 16 and 21 to 40 contain solely inactive products which absorb in the ultra-violet. Fractions 17 to 20, having activities between 80,000 and 180,000 u./cc., are combined.

The solution is lyophilised. Purified 19,042 R.P. (3.35 g.) of strength 6150 u./mg. is obtained in the form of a mixture of sulphates and hydrochlorides.

This product contains carbon, hydrogen, oxygen, nitrogen, sulphur and chlorine. Its elementary composition is approximately:

| | Percent |
|---|---|
| C | 50.0 |
| N | 20.5 |
| H | 7.0 |
| S | 2.0 |
| O | 17.5 |
| Cl | 3.0 |

Appearance: light yellow amorphous powder
Ultra-violet spectrum (determined with a 0.05% solution in water):

absorption at 200 nm. $E_{1\,cm.}^{1\%}=555$ absorption minimum at 243 nm. $E_{1\,cm.}^{1\%}=11$ absorption maximum at 257 nm. $E_{1\,cm.}^{1\%}=12.7$ Infra-red spectrum (determined with tablets of a mixture with KBr).

Figure 1:
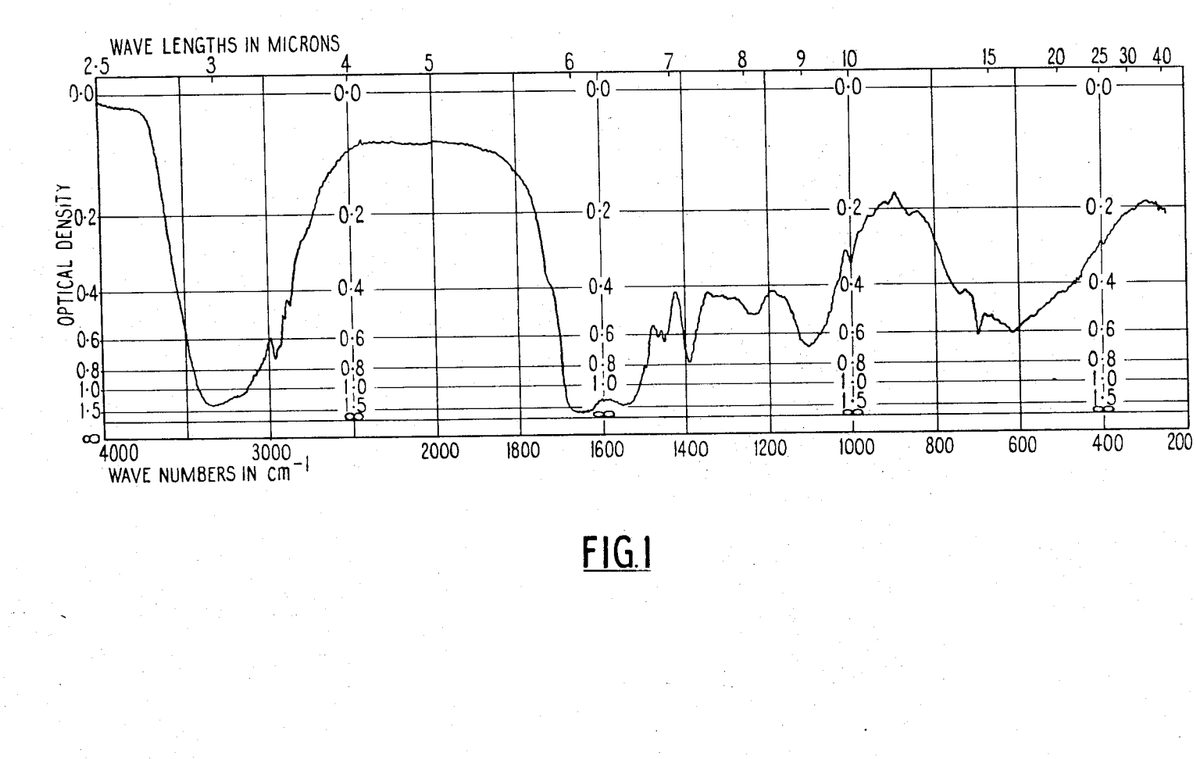

This spectrum is shown in FIG. 1, in which the abscissae give the wave lengths expressed in microns (upper scale) and the wave numbers in cm.$^{-1}$ (lower scale), and the ordinates give the optical density.

Table V below gives the principal infrared absorption bands of this product.

TABLE V

| 3,350 vs | 2,750 sh | 1,465 m | 1,235 m | 910 vw | 490 sh |
|---|---|---|---|---|---|
| 3,280 sh | 1,730 m | 1,450 m | 1,175 sh | 860 vw | 450 sh |
| 3,170 sh | 1,670 s | 1,445 sh | 1,105 s | 740 m | 395 vw |
| 2,960 m | 1,645 vs and broad | 1,390 m | 1,000 w | 700 m | |
| 2,935 sh | 1,550 s and broad | 1,330 vw | 970 sh | 615 s | |
| 2,870 w | 1,495 sh | 1,295 vw | 945 vw | 560 sh | | where vs=very strong, m=medium, vw=very weak, s=strong, w=weak, and sh=shoulder.

EXAMPLE 6

The product (1.33 g.) prepared under the conditions of Example 5 and of strength 5900 u./mg. is dissolved in an aqueous-alcoholic mixture (25 cc.) containing 18% (v./v.) of ethanol.

The solution is chromatographed through a column of "Sephadex LH 20" dextran gel. The column is 5.3 cm. in diameter and contains a dextran gel (500 g.) swollen by an aqueous-alcoholic mixture containing 18% (v./v.) of ethanol (giving a height of 65 cm.). The solution is passed through at a constant flow rate of 65 cc./hour and this is followed by elution with the same aqueous-alcoholic mixture and at the same flow rate. The eluate is collected in fractions of about 10 cc. and its optical density is measured continuously by a "Uvicord L.K.B." analyser at 253.7 nm. The diagram obtained shows two well-separated peaks. The fractions corresponding to each of the peaks are combined, the alcohol is removed by evaporation in vacuo and the residue is lyophilised.

Fractions 63 to 74 yield 21,052 R.P. (290 mg.) in the form of a sulphate of strength 6550 u./mg. Fractions 85 to 104 yield 21,053 R.P. (620 mg.) in the form of a hydrochloride of strength 6400 u./mg. The fractions preceding the first peak and those following the second peak contain small quantities of products of low activity.

EXAMPLE 7

The crude product (182 g.) prepared under the conditions described in Example 2 and of strength 300 u./mg. is treated under the conditions described in Examples 3 and 4, the intermediate lyophilisation being replaced by a concentration under reduced pressure at 30° C. At the end of the chromatography on "Biogel P4," the active fractions amounting to 550 cc. are concentrated under reduced pressure at 30° C.; a solution (50 cc.) of strength 475,000 u./cc. is thus obtained.

This solution is chromatographed through a column of activated alumina which has beforehand been treated with hydrochloric acid (pH 4) under the conditions described in Example 5. 19,042 R.P. (2.7 g.) of strength 6250 u./mg. is obtained. The product thus prepared contains several constituents, all in the form of hydrochlorides. Its elementary composition is approximately:

|   | Percent |
|---|---|
| C | 50.5 |
| N | 20.0 |
| H | 6.8 |
| Cl | 6.55 |
| O | 16.15 |

It is characterised by the physical properties given below:

Appearance: light yellow amorphous powder
Ultra-violet spectrum (determined with a 0.05% solution in water)

absorption at 200 nm. $E^{1\%}_{1cm.}=585$ absorption minimum at 243 nm. $E^{1\%}_{1cm.}=7$ absorption maximum at 257 nm. $E^{1\%}_{1cm.}=7.7$

EXAMPLE 8

The product (12.3 g.) prepared under the conditions of Example 7 and of strength 5,120 u./mg. is dissolved in an aqueous-alcoholic mixture (75 cc.) containing 18% (v./v.) ethanol.

The solution is chromatographed through a column of "sephadex LH 20" dextran gel. The column is 10 cm. in diameter and contains dextran gel (1.6 kg.) swollen by an aqueous-alcoholic mixture containing 18% (v./v.) ethanol (giving a height of 60 cm.). The solution is passed through the column at a constant flow rate of 160 cc./hour and this is followed by elution with the same aqueous-alcoholic mixture at the same flow rate. The eluate is collected in fractions of about 45 cc. and its optical density is measured continuously by means of a "Uvicord L.K.B." analyser at 253.7 nm. The diagram obtained shows a first peak (fractions 43 to 50) corresponding to 21,052 R.P. followed by a principal peak (fractions 55 to 74) corresponding to 21,053 R.P. The most active fractions (61 to 69) are recombined; the alcohol is removed by evaporation in vacuo and the residue is lyophilised.

21,053 R.P. hydrochloride (6 g.) of strength 6,600 u./mg. is obtained.

The present invention also comprises pharmaceutical compositions containing, as active ingredient, at least one of 19,042 R.P., 21,052 R.P. and 21,053 R.P., in association with a pharmaceutically acceptable carrier and/or a compound which may itself be physiologically active. Such compositions may be in any form which is known to be appropriate for the envisaged method of administration. 19,042 R.P. and its constituents can be administered intravenously, intramuscularly, orally or percutaneously, with intravenous administration (perfusion being the preferred method of administration.

19,042 R.P. and its constituents may be used in human therapy as antifibrinolytic agents for the prevention and treatment of hemorrhages by fibrinolysis, as anticoagulants and as trypsin inhibitors for the treatment of cutaneous lesions of a circulatory or traumatic origin and of thrombo-embolic illnesses.

The doses which can be used vary according to the desired threapeutic effect, the method of administration and the duration of the treatment; they are generally between 0.1 and 5 g. of active product daily for an adult when administered intravenously or subcutaneously.

The following example illustrates pharmaceutical compositions according to the invention.

EXAMPLE 9

A solution of the following composition is prepared immediately before use:

21,053 R.P.—0.5 g.
Apyrogenic physiological solute—20 g.

The solution thus obtained is used immediately by intravenous perfusion.

We claim:
1. An enzyme inhibitor comprising the substance herein designated 21,052 R.P. which, in the form of a sulphate containing carbon, hydrogen, oxygen, nitrogen and sulphur and is of the approximate elementary composition C=48.3%, H=6.0%, O=18.2%, N=21.2%, S=4.5%, possesses the following characteristics: a white amorphous powder which is very soluble in water and in dilute acids, soluble in mixtures of water and alcohols and of water and acetone, and very sparingly soluble in concentrated aqueous solutions of neutral salts, in anhydrous alcohols, acetone, hexane, ethyl acetate, diethyl ether and chlorinated hydrocarbons, and which produces on acid hydrolysis arginine, phenyl-alanine, proline and valine in the ratio 1:1:1:5, and seven guanidines; its ultra-violet spectrum (determined with a 0.05% solution in water) shows absorption at 200 nm.

$(E^{1\%}_{1cm.}=435)$ an absorption maximum at 257 nm.

$(E^{1\%}_{1cm.}=5.25)$ and an absorption minimum at 243 nm.

$(E^{1\%}_{1cm.}=4.5)$ its infrared spectrum (determined with tablets of a mixture with potassium bromide) shows principal absorption bands as follows: 3350 strong, 3200 strong, 2960 medium, 2940 shoulder, 2875 weak, 2740 shoulder, 1730 shoulder, 1715 shoulder, 1655 very strong, 1640 medium, 1545 strong, 1525 shoulder, 1505 shoulder, 1495 shoulder, 1470 weak, 1450 medium, 1445 very weak, 1435 shoulder, 1390 medium, 1380 very weak, 1250 weak, 1220 shoulder, 1115 strong, 1030 shoulder, 995 weak, 970 weak, 945 shoulder, 910 very weak, 860 weak, 740 medium, 715 shoulder, 695 medium, 615 strong, and its optical rotation (determined with a 0.9% solution in water) is $[\alpha]_D^{20}=-22°\pm1°$, $[\alpha]_{436}^{20}=-45.5°\pm1.5°$, $[\alpha]_{365}^{20}=-71°\pm2°$ or the non-toxic acid addition salts thereof.

2. The sulfate of the enzyme inhibitor of claim 1.
3. The hydrochloride of the enzyme inhibitor of claim 1.
4. An enzyme inhibitor comprising the substance herein designated 21,053 R.P. which, in the form of a hydrochloride, contains carbon, hydrogen, oxygen, nitrogen and chlorine and is of the approximate elementary composition C=49.5%, H=7.1%, O=17.5%, N=21.8%

Cl=4.9%, possesses the following characteristics: a white amorphous powder which is very soluble in water and in dilute acids, soluble in mixtures of water and alcohols and of water and acetone, and very sparingly soluble in concentrated aqueous solutions of neutral salts, in anhydrous alcohols, acetone, hexane, ethyl acetate, diethyl ether and chlorinated hydrocarbons, and which produces on acid hydrolysis arginine, phenyl-alanine, proline and valine in the ratio 1:1:1:5, and seven guanidines; its ultra-violet spectrum (determined with a 0.05% solution in water) shows absorption at 200 nm.

$$(E_{1\,cm.}^{1\%} = 530)$$

an absorption maximum at 257 nm.

$$(E_{1\,cm.}^{1\%} = 3.4)$$

and an absorption minimum at 243 nm.

$$(E_{1\,cm.}^{1\%} = 2.9)$$

its infrared spectrum (determined with tablets of a mixture with potassium bromide) shows principal absorption bands as follows: 3340 strong, 3260 shoulder, 3190 medium, 2960 medium, 2940 shoulder, 2880 medium, 2750 shoulder, 1735 shoulder, 1720 shoulder, 1645 very strong, 1545 strong, 1525 shoulder, 1505 shoulder, 1495 shoulder, 1465 weak, 1450 medium, 1430 shoulder, 1390 medium, 1330 weak, 1295 weak, 1230 medium, 1225 medium, 1175 weak, 1125 weak, 1100 medium, 1030 shoulder, 995 medium, 945 weak, 910 weak, 860 weak, 740 shoulder, 720 shoulder, 695 medium, 630 shoulder, 590 strong, and its optical rotation (determined with a 0.9% solution in water) is $[\alpha]_D^{20} = -23.5° \pm 1°$, $[\alpha]_{436}^{20} = -46.5° \pm 1.5°$; $[\alpha]_{365}^{20} = -71.5° \pm 2°$ or the nontoxic acid addition salts thereof.

5. The sulfate of the enzyme inhibitor of claim 4.

6. The hydrochloride of the enzyme inhibitor of claim 4.

7. An enzyme inhibitor comprising the substance herein designated 19,042 R.P. which possesses the following characteristics: a light yellow amorphous powder, which is very soluble in water and in dilute acids, soluble in mixtures of water and alcohols and of water and acetone, and very sparingly soluble in concentrated aqueous solutions of neutral salts, in anhydrous alcohols, acetone, hexane, ethyl acetate, diethyl ether and chlorinated hydrocarbons, and which produces on acid hydrolysis arginine, phenyl-alanine, proline, valine and seven guanidines: when in the form of a mixture of sulphates and hydrochlorides with the approximate elementary composition C=50.0%, H=7.0%, O=17.5%, N=20.5%, S=2.0% and Cl=3.0%, its ultra-violet spectrum (determined with a 0.05% solution in water) shows absorption at 200 nm.

$$(E_{1\,cm.}^{1\%} = 555)$$

an absorption minimum at 243 nm.

$$(E_{1\,cm.}^{1\%} = 11)$$

and an absorption maximum at 257 nm.

$$(E_{1\,cm.}^{1\%} = 12.7)$$

and its infrared spectrum (determined with tablets of a mixture with potassium bromide) shows principal absorption bands as follows: 3350 very strong, 3280 shoulder, 3170 shoulder, 2960 medium, 2935 shoulder, 2870 weak, 2750 shoulder, 1730 shoulder, 1670 strong, 1645 very strong and broad, 1550 strong and broad, 1495 shoulder, 1465 medium, 1450 medium, 1445 shoulder, 1390 medium, 1330 very weak, 1295 very weak, 1235 medium, 1175 shoulder, 1105 strong, 1000 weak, 970 shoulder, 945 very weak, 910 very weak, 860 very weak, 740 medium, 700 medium, 615 strong, 560 shoulder, 490 shoulder, 450 shoulder and 395 very weak.

8. A process for the preparation of the enzyme inhibitor of claim 7 which comprises aerobically cultivating *Streptomyces hygroscopicus DS 10,408* (NRRL 3286) in an aqueous nutrient medium containing assimilable sources of carbon, nitrogen and inorganic substances at a pH within the range 6.0 to 7.8 and at a temperature of from 23° C. to 40° C., until substantial enzyme inhibitor is produced and extracting said enzyme inhibitor formed during the culture as a mixture of bases or non-toxic acid addition salts.

9. Process according to claim 8 in which said enzyme inhibitor is separated into its constituents, as base or as non-toxic acid addition salt, by chromatography on a dextran or polyacrylamide gel or on alumina in aqueous or aqueous-alcoholic solution.

References Cited

Miller, The Pfizer Handbook of Microbiao Metabolites, McGraw-Hill Book Co., Inc., New York, 1961, pages 575 and 580.

JEROME D. GOLDBERG, Primary Examiner

U.S. Cl. X.R.

424—118; 195—80